Figure 1:
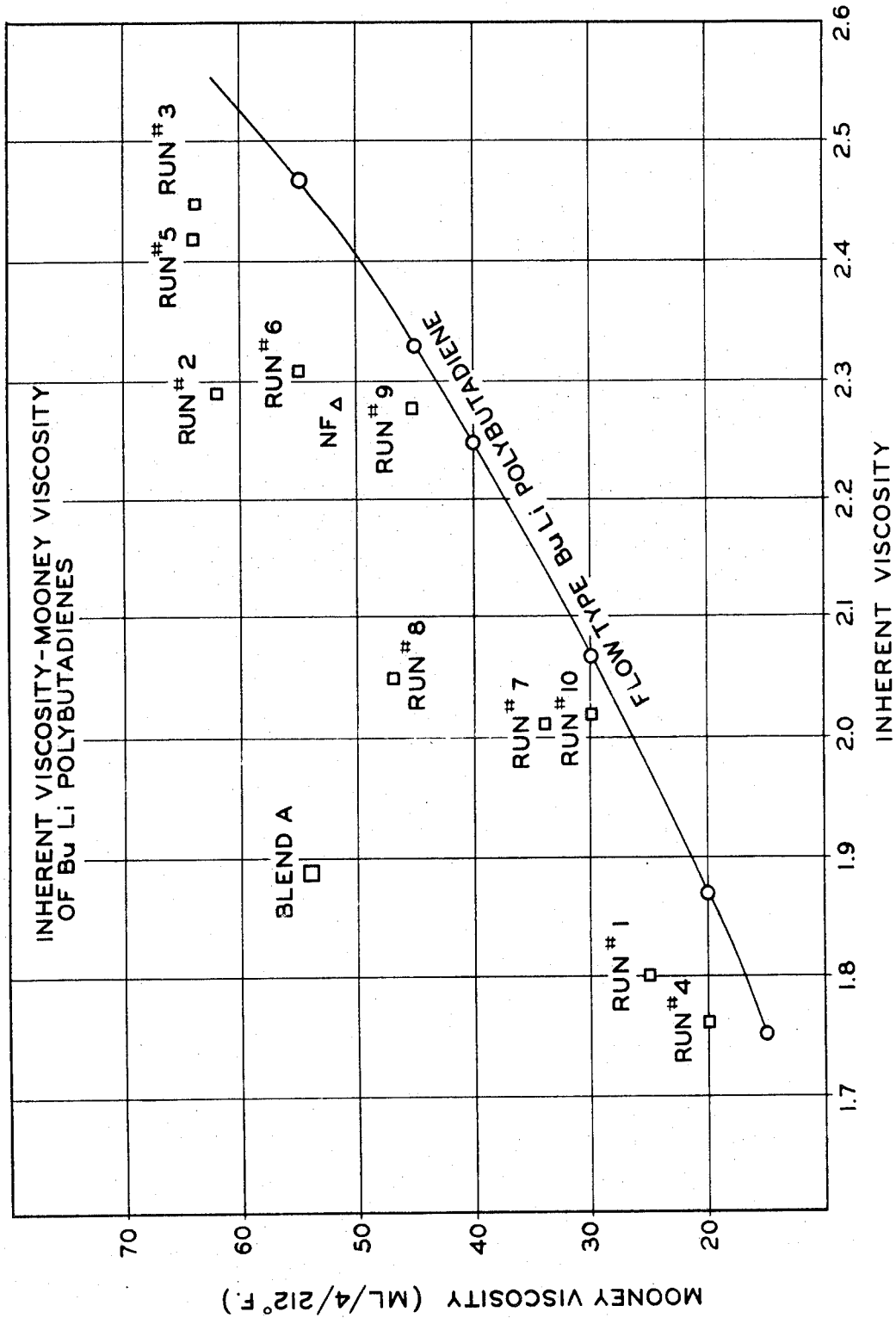

›United States Patent Office 3,629,223
Patented Dec. 21, 1971

3,629,223
POLYMER AND PROCESS
Norman F. Keckler, Stow, Ohio, assignor to The Firestone Tire & Rubber Company, Akron, Ohio
Continuation of abandoned application Ser. No. 601,159, Dec. 12, 1966. This application Sept. 29, 1969, Ser. No. 863,019
Int. Cl. C08d 3/06, 3/08; C08f 3/16
U.S. Cl. 260—94.2
1 Claim

ABSTRACT OF THE DISCLOSURE 1,3-butadiene which contains at least 400 p.p.m. of 1,2-butadiene (or its equivalent in alpha-acetylenes, carbonyls or propadiene) is polymerized at a temperature of 315° F. or higher with a lithium catalyst.

---

This application is a continuation of Ser. No. 601,159, filed Dec. 12, 1966 and now abandoned.

This invention relates to the process of producing homopolymers of butadiene.

The polybutadienes produced by the process of this invention may be of the non-flow type and contain little or no gel. The butadiene used in their production is relatively impure butadiene, and due to the high temperature employed, the time of the polymerization reaction is reduced very substantially. A non-flow polymer is described as a polymer having a Parallel-Plate Plastometer Recovery Value greater than substantially 0.75 mm. by ASTM D926–56 of 1961.

The commercial butadienes have contained alpha-acetylenes, 1,2-butadiene and occasionally some propadiene and/or carbonyls as impurities which act as modifiers for polybutadiene preparation by the lithium-catalyst system. These impurities which act as modifiers are capable of acting independently or additively or may react synergistically in the presence of one another. The quality of synthetic rubber grade butadiene produced by the United States Government-operated butadiene plants until 1955, was of the quality to which, in general, this invention applies. In the last few years, a considerable improvement in quality of some of the butadienes produced has been noted and this is particularly observed when used with the lithium based catalyst system.

The process of this invention involves polymerizing these commercial butadienes by a batch or continuous reaction in which the polymerization temperature exceeds 315° F. although the peak temperature required in any instance will depend upon the amount of the modifiers present. The kinetic data indicates that polymerizing at temperatures over 315° F. completes the polymerization in less than one minute. In commercial operations, the peak will be reached at or near the end of the polymerization. The reaction is exothermic and the heat required to operate at the desired conditions is generally obtained from the heat of polymerization. In a batch or continuous polymerization the initial temperature may be the lowest temperature at which polymerization occurs such as, for example, 60° F., or the contents of the reaction vessel may be heated to a higher temperature such as 125 or 150° F. or higher before adding catalyst and initiating the reaction. The peak temperature may be controlled by the butadiene/hydrocarbon (solvent) ratio. For example, a butadiene/hexane mixture of 75/25 ratio will yield a maximum temperature at adiabatic conditions of approximately 450° F. if initiated at 200° F. A 50/50 mixture would have a peak temperature of approximately 700° F. at similar conditions. Butadiene/hydrocarbon ratios ranging from ratios of 5/95 to 100/0 may be used with those ranging between 10/90 to 35/65 preferred in order to meet the requirements for commercial production rates, the peak temperature desired, pressure limitations, and polymer/solvent mixtures with a viscosity that may be readily handled by commercial equipment. The desired high temperatures advantageously are obtained by reacting in a manner approaching an adiabatic condition, in both batch and continuous operations.

Figure 2:
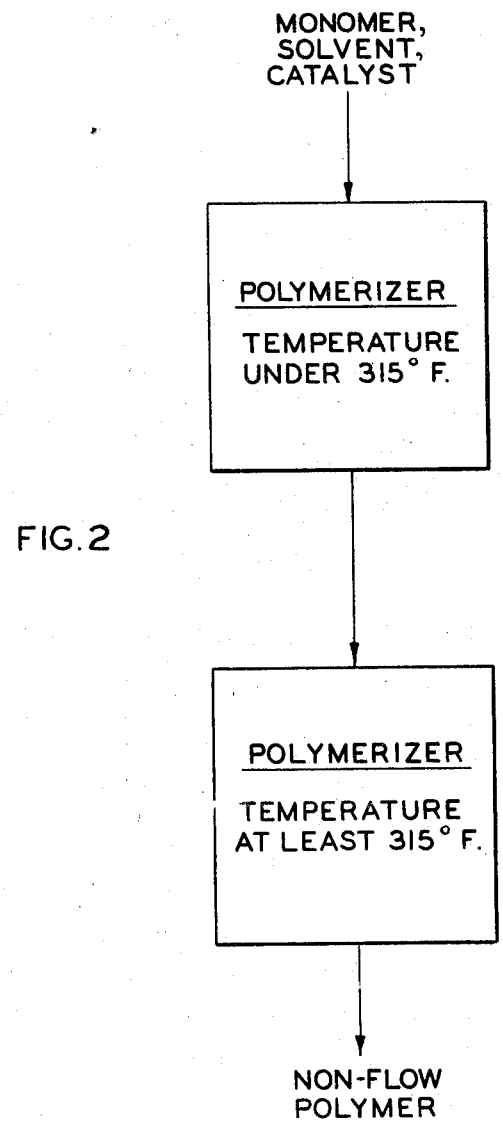

In describing the invention, reference is made to the drawings, in which:

FIG. 1 compares properties of polybutadienes produced by different processes; and FIG. 2 is a flow sheet of a continuous process which utilizes the invention.

The butadiene for carrying out this invention will contain in excess of 400 parts per million (abbreviated as p.p.m.) of 1,2-butadiene or equivalent modifiers. (Throughout, the references are to parts by weight, unless otherwise indicated.) Various alpha-acetylenes which exhibit this modifying effect may be present as impurities, such as methyl acetylene, ethyl acetylene, and vinyl acetylene. Hydrocarbon carbonyls (e.g. methylethyl ketone) and propadiene also exhibit the modifying phenomena shown by alpha-acetylenes and 1,2-butadiene, although normally present in trace amounts.

Analyses of 1,3-butadienes which are typical of those used in carrying out the experiments referred to herein, follow:

|  | A | B | C | D |
|---|---|---|---|---|
| Butadiene, percent | 99.5 | 99.7 | 99.6 | 98.7 |
| 1,2-butadiene, p.p.m | 2,900 | 1,500 | 1,000 | 4,320 |
| Alpha-acetylenes, p.p.m | 240 | 350 | 390 | 565 |

Hydrocarbon carbonyls and propadiene were present in trace amounts at the most. Thus a suitable butadiene contains total modifier equal to substantially 1000 to 4000 parts per million of 1,2-butadiene and 200 to 400 parts per million of one or more alpha-acetylenes.

In the process of this invention, the butadiene is reacted in solution in an inert organic solvent using a hydrocarbon lithium catalyst such as an alkyllithium and preferably butyllithium. Other lithium-based catalysts may be utilized such as disclosed in British Pat. 817,693, and that patent is relied upon herein for its disclosure of the polymerization procedure. Alpha-acetylenes react with such catalysts to produce lithium acetylides and it is therefore desirable to use no more alpha-acetylenes than is required to obtain the desired product. Therefore, usually the amount of alpha-acetylenes will be limited to about 300 to 400 parts per million of the butadienes. 1,2-butadiene does not react with the hydrocarbon lithiums as rapidly as the alpha-acetylenes, due to isomerization of 1,2-butadiene to ethyl acetylene which occurs at a relatively slow rate.

The process may be carried out batchwise or continuously using a solvent such as pentanes or hexanes or cyclohexane or hexene or benzene or other hydrocarbon solvent or a mixture of solvents any of which must be inert to the lithium catalyst. The use of a solvent is not essential. The amount of catalyst (expressed as n-butyllithium) employed will usually be in the range of about .04 or .05 up to .10 or .12 part by weight per hundred parts of monomer, more or less, depending upon the amount of impurity present, the temperature employed, the Mooney of the polybutadiene, etc. The common impurities encountered are water, oxygen, peroxides and sulfur compounds in addition to the impurities previously mentioned which act as modifiers. The polymerization may be carried out in the reaction medium as a batch operation or as a continuous operation. The polymerization of butadiene with hydrocarbon lithium catalysts is a first-order reaction dependent upon the monomer concentration and for each increase of 10° C. in the polymerization rate is approximately doubled. In a batch operation the polymerization is initiated at any desired temperature and as it proceeds the temperature rises and the operation should be controlled so that at least at some stage a temperature above 315° F. is reached. Polymerization is extremely rapid after temperatures exceeding 200° F. are reached. Polymer of non-flow properties may be obtained, dependent upon polymer molecular weight, and these non-flow characteristics are more evident as the polymer molecular weight increases. Non-flow properties appear to be related to a branching-type reaction obtained at the higher polymerization temperatures dependent on the monomer purity which, in turn, is related to active polybutadienyl lithium polymer chains. The branching is believed to occur through a lithium linkage to other polymer chains. Peak temperatures in excess of 400° F. are reached when producing non-flow polybutadiene in batch operations depending upon the initiation temperature and the monomer concentration.

In continuous operations there is a greater choice of temperature to obtain the desired polymer properties. The feed, whether butadiene or a solution of the butadiene, may be added increment-wise in a continuous operation and the catalyst may be added in increments at the same time as the feed or at other times. If the amount of allene or alpha-acetylene in the feed is increased by the addition of allene or alpha-acetylene thereto, such addition may be made to the butadiene stream or to a solution of the butadiene, or it may be added separately, and this may be done in increments or continuously, or it may all be added initially.

For non-flow polybutadienes the conditions are regulated to give any Parallel-Plate Plastometer Recovery Value in excess of 0.75 mm. at 73° F. Polybutadienes may be produced with non-flow properties by this invention.

The following table gives data on different polymerizations using butadiene having essentially the analysis for Butadiene B, listed above. Peak polymerization temperatures exceeded 315° F. The reactions were carried out in a 1500 ml. stainless steel bomb which was dried and swept with nitrogen. The butadiene content in the solvent was kept at 20 to 25 percent. The amount of butadiene charged was determined. The desired amount of n-butyllithium was injected. This was done at room temperature. Except in Run No. 9 (as explained below), the bomb was placed in a 200° F. constant-temperature water bath and rotated end-over-end for one-half hour. The bomb was then removed and its contents were immediately discharged and worked up in a normal manner. In all cases, substantially 100 percent conversion was obtained.

Equal portions of each of the three Runs 1, 2 and 3 were combined to produce Blend A to arrive at a commercial Mooney value of about 55. Butadiene/mixed hexane (20/80) mixtures were used in each of these runs.

TABLE I

| | Runs | | | |
|---|---|---|---|---|
| | 1 | 2 | 3 | Blend A |
| BuLi, phm.[1] | 0.108 | 0.100 | 0.100 | |
| ML/4/212° F. | 25 | 62 | 64 | 54 |
| Inherent viscosity [2] | 1.80 | 2.29 | 2.45 | 1.89 |
| Recovery value [3] | 1.15 | 1.90 | 1.68 | 1.58 |

[1] Phm.=Parts per 100 parts by weight of monomer.
[2] Industrial and Engineering Chemistry, vol. 40, page 351 (1948).
[3] Parallel-Plate Plastometer Recovery Value measured in millimeters.

The results of other runs are recorded in the following table. The solvent employed in each was mixed hexanes except in Run No. 8 in which mixed pentanes was the solvent.

TABLE II

| Runs | 4 | 5 | 6 | 7 | 8 | 9 |
|---|---|---|---|---|---|---|
| Conversion | 100 | 95.0 | 98.0 | 98.4 | 100 | 100 |
| BuLi, phm | 0.115 | 0.11 | 0.11 | 0.125 | 0.105 | 0.108 |
| Butadiene/solvent | 20/80 | 24/76 | 24/76 | 24/76 | 25/75 | 25/75 |
| ML/4/212° F.[1] | 20 | 64 | 55 | 34 | 47 | 45 |
| Inherent viscosity | 1.76 | 2.42 | 2.31 | 2.01 | 2.05 | 2.27 |
| Recovery value | 0.73 | 1.88 | 1.83 | 1.07 | 2.12 | 0.46 |

[1] ASTM D927-57T.

Each of the foregoing products, except that of Run No. 9, had non-flow characteristics and was gel free. The reactions were carried out under similar temperature conditions except Run No. 9 which was carried out by heating ½ hour at 125° F., ½ hour at 135° F., ½ hour at 160° F., ½ hour at 190° F. and ½ hour at 200° F. The polymerization in Run No. 9 was essentially complete after the ½-hour heating at 160° F. and this data is included for comparison with high temperature reactions which give desirable non-flow properties.

In FIG. 1 of the drawing, the curve shows the inherent viscosity-Mooney viscosity relationship of flow-type polybutadiene, prepared from butadiene such as butadiene B, and polymerized batch-wise at peak temperatures not in excess of 225° F. Polybutadienes of Runs No. 1 through 8 of Tables I and II (identified as Runs 1 to 8) are compared to the flow-type polybutadienes. Point NF shows the inherent viscosity-Mooney viscosity relationship of a polybutadiene catalyzed with a lithium catalyst in the presence of a trace amount of a cross-linking agent and the polymer is a non-flow polybutadiene with a Parallel Plate Recovery value of 3.00 mm. (Rec.=3.0 mm.)

The vertical deviation from the curve is an indication of the degree of branching of the polymers which is related with non-flow properties. The deviation of Blend A shows the advantage of blending high and low molecular weight polymers.

Thus, the drawing shows the deviations in inherent viscosity-Mooney viscosity relationships of polymers prepared at high temperatures and having non-flow properties as compared with the flow-type polymers obtained at lower temperatures. The non-flow polybutadienes preferred commercially will, generally speaking, have an inherent viscosity of at least 1.5 with substantially no gel, a Mooney viscosity of at least 20 and a Parallel-Plate Plastometer Recovery Value of at least 0.75.

The Parallel-Plate Plastometer Recovery values and quantitative measurements of the flow of polymer cubes on a level or inclined surface are evidence of branching of the polybutadiene obtained in the high temperature polymerizations. The degree of branching is indictaed from a plot of inherent viscosity versus Mooney viscosity, such as that given in the drawing. For a polybutadiene of a given inherent viscosity value the more the polymer is branched the higher the Mooney viscosity will be.

The molecular weight distribution was determined by fractional solution precipitation and was typical of the molecular weight distribution of production polybutadiene catalyzed with butyllithium, and the following table shows the results of this determination:

| Inherent viscosity range: | Polymer, percent |
|---|---|
| 0–1 | 1.4 |
| 1–2 | 35.6 |
| 2–3 | 63.0 |

The microstructure of Blend A is compared with the microstructure of polybutadiene (control) prepared from butadiene B in a 12° F. temperature bath, with the peak temperature not exceeding 138° F.

|  | Percent | |
| --- | --- | --- |
|  | Blend A | Control |
| Cis-1,4-polybutadiene | 38.1 | 37.6 |
| Trans-1,4-polybutadiene | 51.0 | 54.1 |
| 1,2-polybutadiene | 10.8 | 8.3 |
| Total found | 101.4 | 96.9 |

The small increase in content of 1,2-polybutadiene is characteristic of high-temperature polymerization.

A reference to microstructure determination may be found in the application of Infra-Red Spectroscopy to Polymers, particularly 1,3-Diene Polymers by J. L. Binder in Rubber Chemistry and Technology, vol. 35, page 57 (January-March 1962).

Table III compares the properties of cured stocks of (a) polybutadiene identified above as Blend A and (b) a commercial non-flow polybutadiene prepared from butadiene B, both obtained with a lithium catalyst. Both polymers had a Mooney (ML/4/212° F.) value of about 55. The stocks were compounded in the following recipe:

|  | Parts by weight |
| --- | --- |
| Polybutadiene | 100 |
| HAF Black | 50 |
| Zinc oxide | 3 |
| Stearic acid | 2 |
| Plasticizer | 10 |
| Sulfur | 1.75 |
| Accelerator | 0.80 |

The stocks were mixed in a laboratory Banbury in a standard manner and tensile slabs were cured for 25, 50 and 100 minutes at 293° F. Other tests were run on stocks cured for 30 and 35 minutes at 300° F. as indicated.

TABLE III

|  | Blend A | Control |
| --- | --- | --- |
| Normal stress-strain properties: |  |  |
| Tensile, p.s.i. after— |  |  |
| 25 minutes | 2,500 | 2,100 |
| 50 minutes | 2,625 | 2,375 |
| 100 minutes | 2,425 | 2,275 |
| Modulus, p.s.i. 300% after— |  |  |
| 25 minutes | 775 | 750 |
| 50 minutes | 1,100 | 1,125 |
| 100 minutes | 1,075 | 1,100 |
| Percent elongation after— |  |  |
| 25 minutes | 600 | 550 |
| 50 minutes | 510 | 470 |
| 100 minutes | 480 | 470 |
| Aged stress-strain properties (48 hours in air-oven at 212° F.): |  |  |
| Tensile, p.s.i. after— |  |  |
| 25 minutes | 2,100 | 1,700 |
| 50 minutes | 1,625 | 1,300 |
| 100 minutes | 1,400 | 1,200 |
| Percent elongation after— |  |  |
| 25 minutes | 270 | 240 |
| 50 minutes | 270 | 240 |
| 100 minutes | 260 | 250 |
| Flexometer test: |  |  |
| Running temperature,[1] ° F | 264 | 306 |
| Deflection, percent | 13.3 | 14.7 |
| Shore A hardness,[2] 73° F | 62 | 61 |
| Ring tear [3] at 212° F, pounds/inch | 299 | 249 |
| DeMattia cut growth: |  |  |
| Flexes to 0.5″ growth | 10,500 | 5,500 |
| Rating, percent | 191 | 100 |

[1] ASTM D623-58 Method A; 143 pounds, 0.1 inch throw, 1,800 r.p.m. Test conducted at room temperature on blocks cured 35 minutes at 300° F.
[2] ASTM D676-59T. Blocks cured 35 minutes at 300° F.
[3] T. F. Lavery et al. Rubber Age 80, 843 (1957). Blocks were cured 30 minutes at 300° F.
[4] ASTM D813-52T. Strips cured 30 minutes at 300° F. Tested at room temperature.

In the reported tests all the primary properties of the compound prepared from Blend A are superior to the compounds from the commercial polymer. Blend A shows superior tensile, aged tensile, desirable lower running temperature, higher ring tear and superior resistance to cut growth.

Butadiene D listed above has the highest modifier level content and was used to prepare the polybutadiene identified as Run No. 10. Polybutadiene of Run No. 10 was prepared in the same manner as those of Runs 1 through 8 and was prepared at a monomer concentration of 22.9 percent. Polybutadiene of Run No. 10 had a Parallel-Plate Recovery value of 0.41 mm., 30 Mooney viscosity and a 2.03 inherent viscosity value. The plot for polymer of Run No. 10 on FIG. 1 shows little deviation from the Mooney viscosity-inherent viscosity curve and the Parallel-Plate Recovery value indicates that the polymer is a flow-type polymer. Thus, at this higher modifier level, a flow-type polybutadiene will be obtained for this Mooney viscosity value and peak temperature. If the modifier level was doubled from that of butadiene D, difficulty in obtaining complete conversion for 55 Mooney viscosity polymer would be encountered.

In general, polybutadienes prepared from butadienes A and C exhibit the same characteristics as obtained from butadiene B for peak polymerization temperatures exceeding 315° F.

FIG. 2 is a flow sheet of a continuous process. Since the polymerization may be as rapid as desired by the controlling of the polymerization temperature, polymerizers of the drawing may be standard synthetic rubber-type reactors or autoclaves or may be pipe reactors or extruder-type polymerizers which are most common to the plastics industry. Thus, polymerizer No. 1 of the flow sheet may be omitted or additional reactors may be added prior to the peak temperature reactor which is at temperatures of 315° F. or higher. Normally, external heat need not be applied due to the exothermic nature of the polymerization reaction and may be controlled by the butadiene/solvent ratio as, for example, from ¼ to ½ ratios of butadiene to solvent. Using two reactors as indicated in FIG. 2, reactor No. 1 may be twice or more the capacity of reactor No. 2 or combinations where reactor No. 1 may be a standard type synthetic rubber reactor and reactor No. 2 may be a pipe reactor or extruder-type reactor. Viscosity of the polymer cement may be controlled for a given molecular weight polymer by the solvent/monomer ratio, operating temperatures and choice of solvent.

The product of the process of the invention is a substantially non-flow, rubbery polybutadiene of excellent utility in all applications in which the polybutadienes taught by British Pat. 817,693 have been found useful, e.g., in blends with natural rubber and/or butadiene-styrene copolymers (both the emulsion-type and the solution-type) and/or high cis-polyisoprene and/or high cis-polybutadiene and/or ethylene-propylene rubbers and/or nitrile rubbers and/or chloroprene rubbers and/or butyl rubber. The polybutadiene of the invention is eminently suitable, either alone or in blends with other elastomers, for extension with substantial amounts, i.e., 15 to 130 phr. (parts per hundred of rubber) of plasticizers (such as extending oils) in conjunction with carbon black, i.e., 40 to 200 phr. of reinforcing black. The polybutadiene of the invention is thus useful in tire treads, tire carcasses and sidewalls, mechanical rubber goods and in other conventional vulcanized rubber articles of commerce. The polybutadiene of the invention can be converted into an aqueous dispersion or latex by conventional methods and find utility in all latex uses.

The polybutadiene of the invention is also useful in various thermoplastic and thermosetting resins as blends and/or as grafts. For example, the novel polybutadiene can be dissolved in styrene, and the latter can be polymerized to produce a high impact polystyrene. Also, the novel polybutadiene can be blended with polypropylene to produce a resin having improved impact strength, especially at low temperatures. The resulting blended resins or grafted resins are useful in molded articles; in cast, extruded or calendered films; in wire coatings; in protective coatings; in filaments and tubing.

I claim:
1. The improvement in the process of polymerizing 1,3-butadiene containing 1,2-butadiene and/or alpha-acetylene as modifier in an amount equivalent to substantially 1000 to 4000 parts per million of 1,2-butadiene and substantially 200 to 400 parts per million of one or more alpha-acetylenes, the polymerization being catalyzed by means of an alkyl lithium catalyst to produce rubbery polybutadiene, which improvement comprises substantially completely polymerizing the 1,3-butadiene under substantially adiabatic conditions with .04 to .12 part of said catalyst (expressed as n-butyllithium) per 100 parts of monomer while at a peak temperature above 315° F. and thereby completing the polymerization in less than substantially a minute, the resulting polybutadiene having a Parallel-Plate Plastometer Recovery value of at least 0.75 mm. and a minimum Mooney viscosity (ML/4/212° F.) of at least 20.

References Cited

UNITED STATES PATENTS

| | | | |
|---|---|---|---|
| 2,559,947 | 7/1951 | Crouch | 260—83.7 |
| 3,068,217 | 12/1962 | Higgins. | |
| 3,175,997 | 3/1965 | Hsilh | 260—85.1 |
| 3,280,094 | 10/1966 | Forman. | |
| 3,318,862 | 5/1967 | Hinton. | |
| 3,331,826 | 7/1967 | Talcott. | |
| 3,382,224 | 5/1968 | Wood. | |

FOREIGN PATENTS 649,296   9/1962   Canada.

JOSEPH L. SCHOFER, Primary Examiner

W. F. HAMROCK, Assistant Examiner

U.S. Cl. X.R.

260—95 R

FO-1050
(5/69)

UNITED STATES PATENT OFFICE
CERTIFICATE OF CORRECTION

Patent No. __3,629,223__  Dated __December 21, 1971__

Inventor(s) __Norman F. Keckler__

It is certified that error appears in the above-identified patent and that said Letters Patent are hereby corrected as shown below:

Col. 4, line 74, "12° F." should read --122° F.--

Col. 8, line 6, "Hsilh" should read --Hsieh--

Signed and sealed this 13th day of June 1972.

(SEAL)
Attest:

EDWARD M. FLETCHER, JR.
Attesting Officer

ROBERT GOTTSCHALK
Commissioner of Patents